United States Patent
Chen

(10) Patent No.: US 10,248,598 B2
(45) Date of Patent: Apr. 2, 2019

(54) INTELLIGENT STORAGE DEVICE SIGNAL TRANSMISSION METHOD FOR BACKING UP DATA ON INTELLIGENT STORAGE MODULE BASED ON SYSTEM TYPE OF ELECTRONIC DEVICE

(71) Applicant: POWER 7 TECHNOLOGY CORP. (Shenzhen), Shenzhen (CN)

(72) Inventor: Mike Chen, Shenzhen (CN)

(73) Assignee: POWER 7 TECHNOLOGY CORP. (SHENZHEN), Shenzhen (CN)

( * ) Notice: Subject to any disclaimer, the term of this patent is extended or adjusted under 35 U.S.C. 154(b) by 22 days.

(21) Appl. No.: 15/453,210

(22) Filed: Mar. 8, 2017

(65) Prior Publication Data

US 2018/0137072 A1  May 17, 2018

Related U.S. Application Data

(63) Continuation-in-part of application No. 15/352,992, filed on Nov. 16, 2016.

(51) Int. Cl.
| | |
|---|---|
| *G06F 13/38* | (2006.01) |
| *G06F 13/42* | (2006.01) |
| *G06F 9/4401* | (2018.01) |
| *G06F 1/16* | (2006.01) |
| *G06F 13/40* | (2006.01) |

(52) U.S. Cl.
CPC .......... *G06F 13/385* (2013.01); *G06F 1/1632* (2013.01); *G06F 9/4406* (2013.01); *G06F 13/4282* (2013.01); *G06F 13/4081* (2013.01)

(58) Field of Classification Search
USPC ....................................................... 710/8–17
See application file for complete search history.

(56) References Cited

U.S. PATENT DOCUMENTS

| | | | |
|---|---|---|---|
| 9,189,378 B1 * | 11/2015 | Ryan | G06F 11/3664 |
| 9,442,741 B2 * | 9/2016 | Ma | G06F 9/4411 |
| 9,756,549 B2 * | 9/2017 | Perdomo | H04W 40/12 |
| 9,848,046 B2 * | 12/2017 | Mehta | H04L 67/1097 |
| 2006/0158154 A1 * | 7/2006 | Maurilus | H04M 1/72527 |
| | | | 320/115 |

(Continued)

*Primary Examiner* — Raymond N Phan
(74) *Attorney, Agent, or Firm* — Muncy, Geissler, Olds & Lowe, P.C.

(57) ABSTRACT

An intelligent storage device signal transmission method includes steps of: electrically connecting intelligent storage module and electronic device; enabling built-in identification system of intelligent storage module uses numeric identification code to identify system type of electronic device and enabling USB communication protocol channel for signal transmission between intelligent storage module and electronic device so that file system of downloaded APP of electronic device can identify file format of intelligent storage module and microprocessor unit of intelligent storage module can define data packet format of DATA block and then transmit data packet to APP of electronic device for data packet resolution. Thus, built-in file system of App of electronic device can identify and solve received data packet and provide file data of resolved data file to data storage software of electronic device for application; and electronic connection between intelligent storage module and electronic device is disconnected after signal transmission is completed.

6 Claims, 6 Drawing Sheets

(56) References Cited

U.S. PATENT DOCUMENTS

| | | | |
|---|---|---|---|
| 2014/0289826 A1* | 9/2014 | Croome | H04L 67/141 |
| | | | 726/5 |
| 2015/0039933 A1* | 2/2015 | Chen | G06F 3/06 |
| | | | 714/6.3 |
| 2015/0082410 A1* | 3/2015 | Fitzgerald | H04L 63/08 |
| | | | 726/9 |
| 2016/0253274 A1* | 9/2016 | Huang | G06F 13/102 |
| | | | 710/33 |
| 2016/0342544 A1* | 11/2016 | Liu | G06F 13/16 |
| 2017/0310751 A1* | 10/2017 | Yeung | H04L 67/1097 |

* cited by examiner

INTELLIGENT STORAGE DEVICE SIGNAL TRANSMISSION METHOD FOR BACKING UP DATA ON INTELLIGENT STORAGE MODULE BASED ON SYSTEM TYPE OF ELECTRONIC DEVICE

FIELD OF THE INVENTION

The present invention relates to intelligent storage technology and more particularly, to an intelligent storage device signal transmission method, which utilizes an identification system of the intelligent storage module to identify the system type of the electronic device being connected to the intelligent storage module, so that a corresponding communication protocol can be implemented for signal transmission between the intelligent storage module and the connected electronic device, allowing the complete data signal of the electronic device to be backed up on the intelligent storage module.

DESCRIPTION OF THE RELATED ART

With the rapid development of technology, many advanced home electrical and electronic devices have been created for home application and for use outdoors. Among various electronic products, mobile electronic devices, such as notebook computers, tablet computers and smart phones are widely invited by people for the advantage of high mobility. Further, a mobile electronic device can be connected to the Internet through wireless transmission. Through the Internet, mobile electronic devices can transport electronic messages from one network to another network around the world without time or space restrictions, not only won the favor of the younger generation, but also widely invited by the juvenile, middle-aged, old and other generations. Nowadays, almost everyone has one mobile phone. Mobile electronic devices are capable of carrying out communications, video call, video meeting or document data processing operations. With the popularity of mobile electronic devices and the utility and convenience of the Internet without borders, a lot of application software programs (Apps) have been continuously created for allowing mobile electronic devices to download data, pictures, photos, videos, software, music, games and other files from the Internet. However, the built-in memory capacity of a mobile electronic device can be insufficient for storing a large amount of downloaded data and electronic signals, and the management of a large amount of downloaded data and signals is not easy. Therefore, mobile electronic device users usually will use other mobile data storage devices, such as large-capacity flash drives, large-capacity hard drives or large-capacity mobile hard drives for backing up data. However, regular large-capacity mobile data storage devices can simply be used for storing and backing up data, they cannot analyze and identify the data to be backed up, resulting in the problem of backing up the data that has already been backed up and the problem of extended period of backup time and waste of labor.

Therefore, how to solve the problem of extended data backup time and waste of labor encountered during the use of a conventional mobile electronic device to back up data is the direction of improvement the relevant manufacturers need to study.

SUMMARY OF THE INVENTION

The present invention has been accomplished under the circumstances in view. It is therefore the main object of the present invention to provide an intelligent storage device signal transmission method, which includes the steps of: electrically connecting an intelligent storage module and an electronic device; enabling the built-in identification system of the intelligent storage module uses a numeric identification code (VID/PID) to identify the system type of the electronic device and enabling a USB communication protocol channel (MUX or AOA) for signal transmission between the intelligent storage module and the electronic device so that the file system of the downloaded APP of the electronic device can identify the file format of the intelligent storage module and the microprocessor unit of the intelligent storage module can define the data packet format of the DATA block and then transmit the data packet to the APP of the electronic device for data packet resolution, and thus, the built-in file system of the App of the electronic device can identify and solve the received data packet and provide the file data of the resolved data file to the data storage software of the electronic device for application; and the electronic connection between the intelligent storage module and the electronic device is disconnected after the signal transmission is completed.

It is another object of the present invention to provide an intelligent storage device signal transmission method for use in a combination mobile of electronic device and storage module for signal transmission, wherein the combination mobile of electronic device and storage module comprises an electronic device and an intelligent storage module. The electronic device is a mobile electronic device selected from the group of smart phones, tablet computers, notebook computers and global positioning systems, comprising a processor and at least one transmission interface electrically connected to the processor. The processor has a data storage software built therein. The data storage software comprises a data browser operation interface, an application layer for the implementation of the operation interface, a data system layer that supports the data system related storage protocols (iOS or Android) of FAT/NTFS/exFAT/Ext, a disk block operation protocol layer, a data transport protocol layer and a data storage layer. Further, the transmission interface is an electric connection interface selected from the group of USB2.0, USB3.0, USB Type-C, USB3.1, Micro USB, Mini USB and Apple Lightning. The intelligent storage module comprises at least one docking interface, a microprocessor unit, a power supply unit, and a housing that houses the at least one docking interface, the microprocessor unit and the power supply unit. The at least one docking interface is extended out of at least one side of the housing. Further, the housing comprising a mobile device holder extended from an outer wall thereof for holding the electronic device. The at least one docking interface is respectively selected from the group of USB2.0, USB3.0, USB Type-C, USB3.1, Micro USB, Mini USB and Apple Lightning. The microprocessor unit is selectively a central processing unit (CPU), a microprocessor or a processor IC that has built therein a detection software for detecting and identifying the backup date, backup time, update date, tag name, and capacity size of a data or electronic signal being received from the electronic device.

It is still another object of the present invention to provide an intelligent storage device signal transmission method, wherein in the step of enabling the built-in identification system of the intelligent storage module is to identify whether the electronic device is an iOS device or Android device by means of a numeric identification code of USB VID or PID; the file system that is built in the microprocessor unit the intelligent storage module is capable of enabling a USB MUX or AOA communication protocol channel to define the packet format for the iOS device or the Android device.

Other advantages and features of the present invention will be fully understood by reference to the following specification in conjunction with the accompanying drawings.

DETAILED DESCRIPTION OF THE PREFERRED EMBODIMENT

Figure 1:
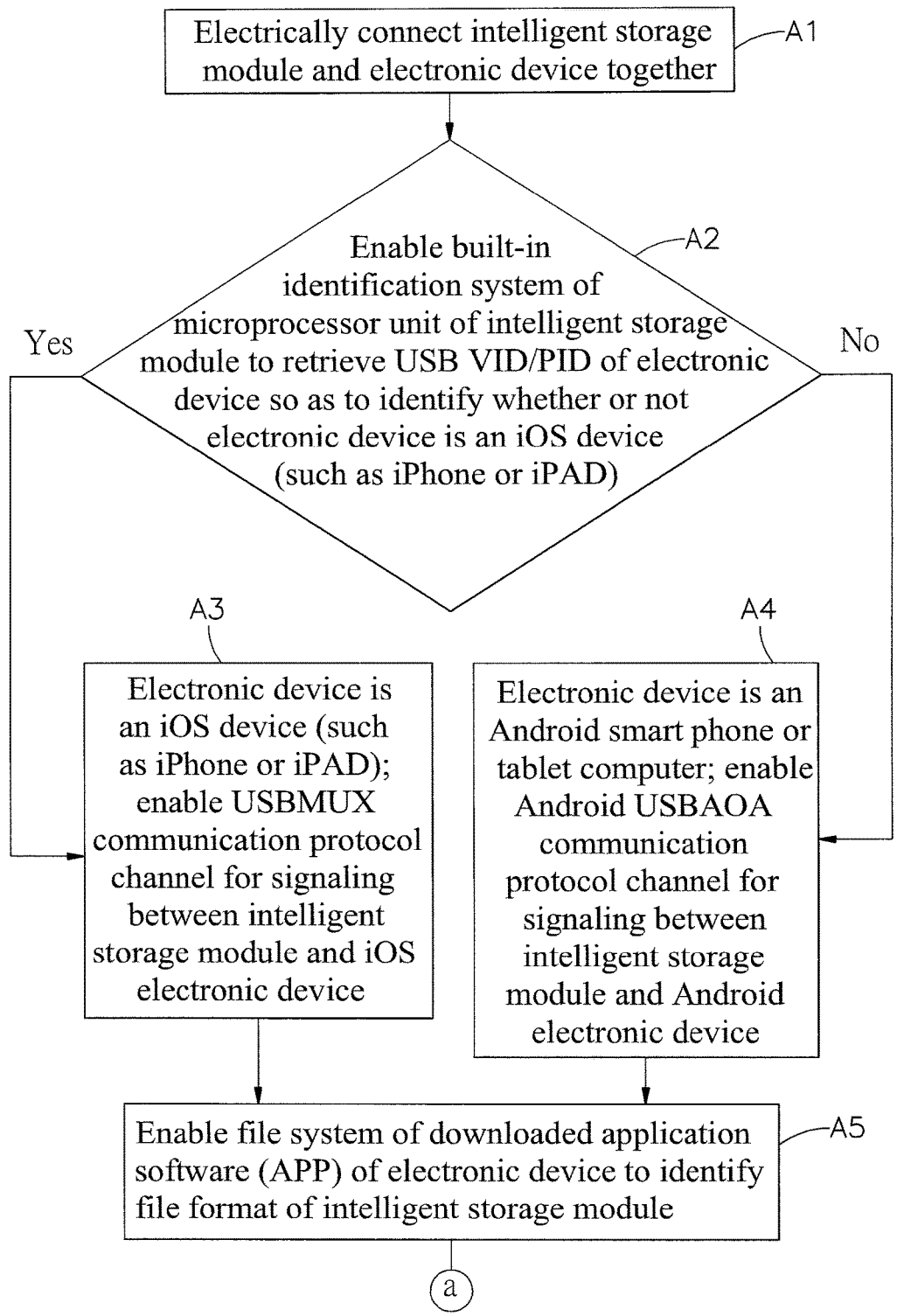
FIG. 1 is a flow chart of an intelligent storage device signal transmission method in accordance with the present invention (I).
Figure 2:
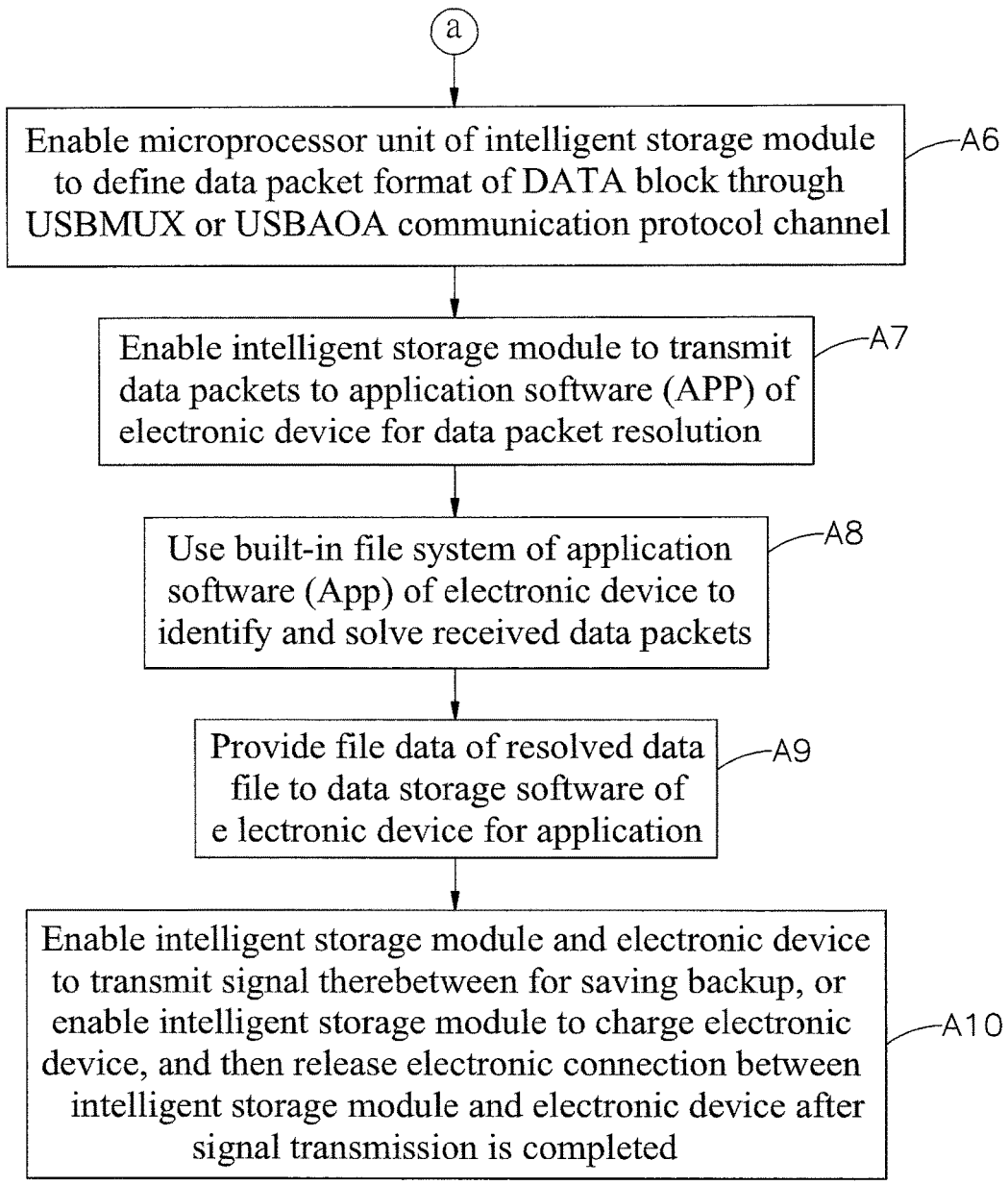
FIG. 2 is a flow chart of an intelligent storage device signal transmission method in accordance with the present invention (II).
Figure 3:
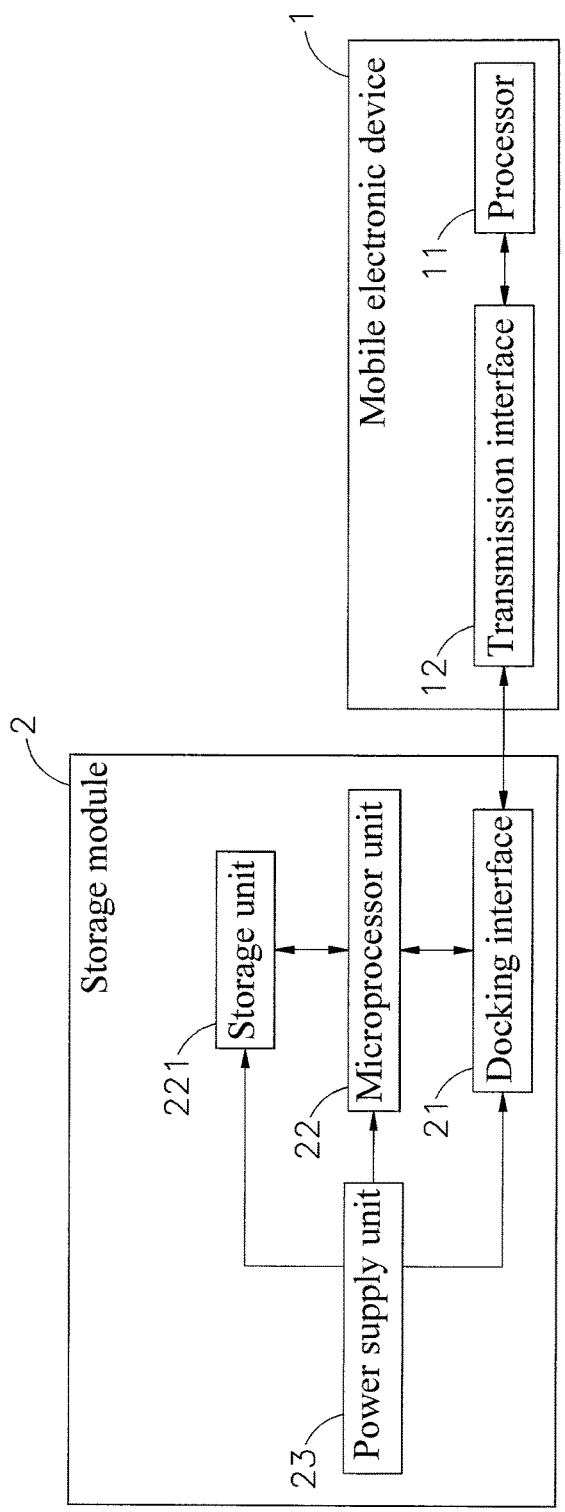
FIG. 3 is a circuit block diagram of a combination of electronic device and intelligent storage module in accordance with the present invention.
Figure 4:
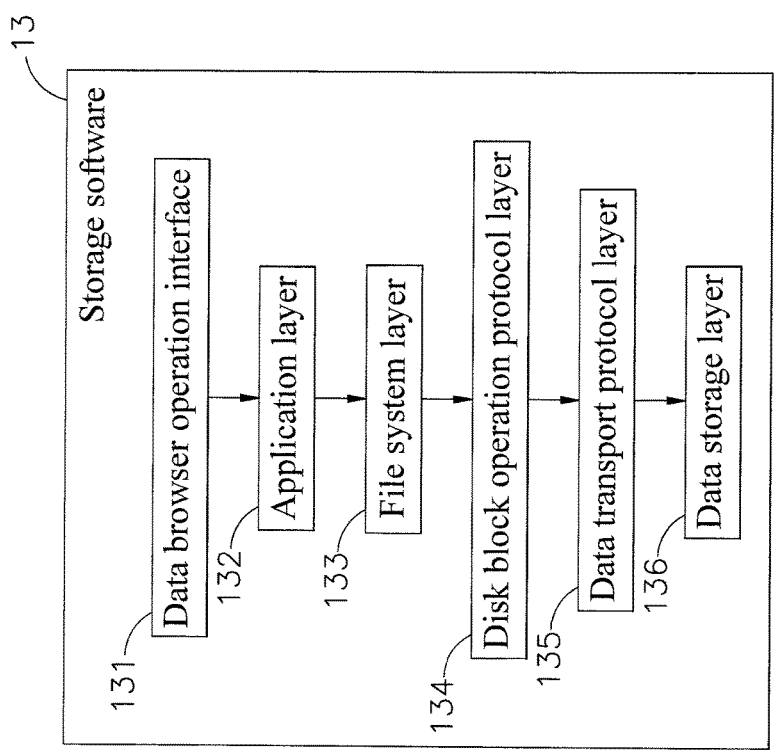
FIG. 4 is a circuit block diagram of the storage software of the electronic device in accordance with the present invention.
Figure 5:
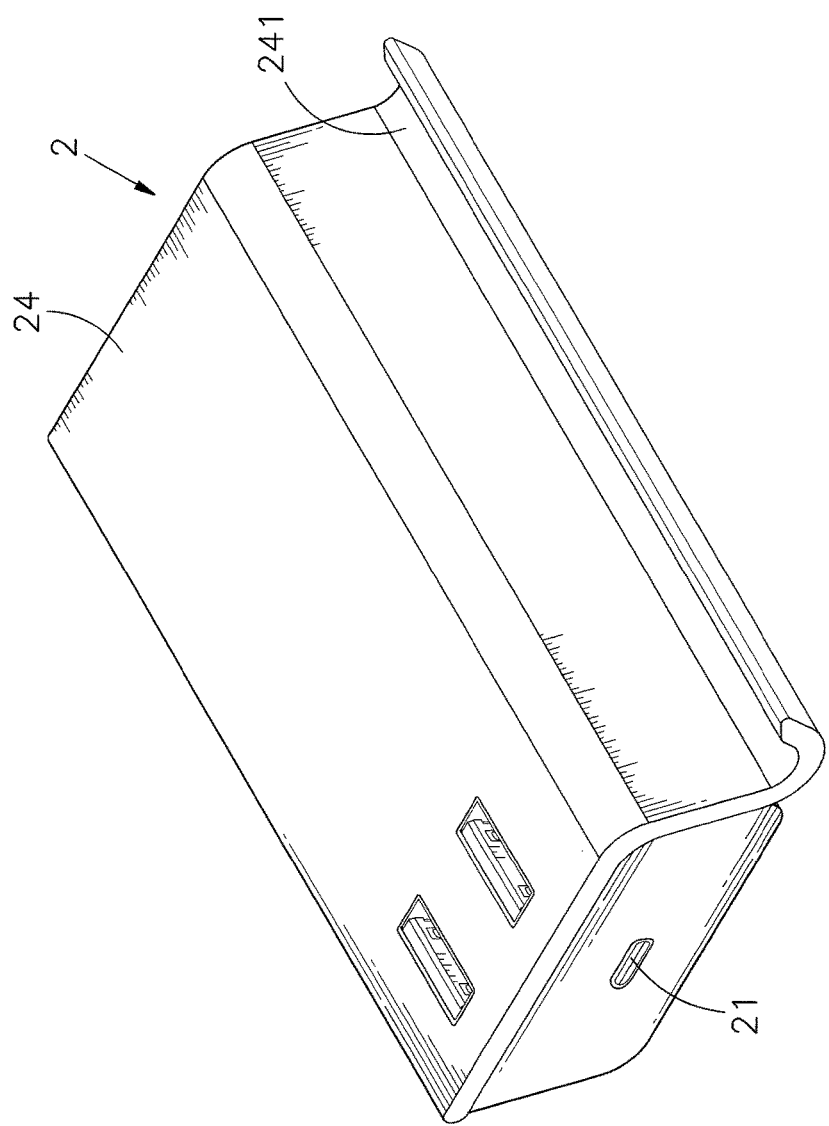
FIG. 5 is an oblique top elevational view of the intelligent storage module in accordance with the present invention.
Figure 6:
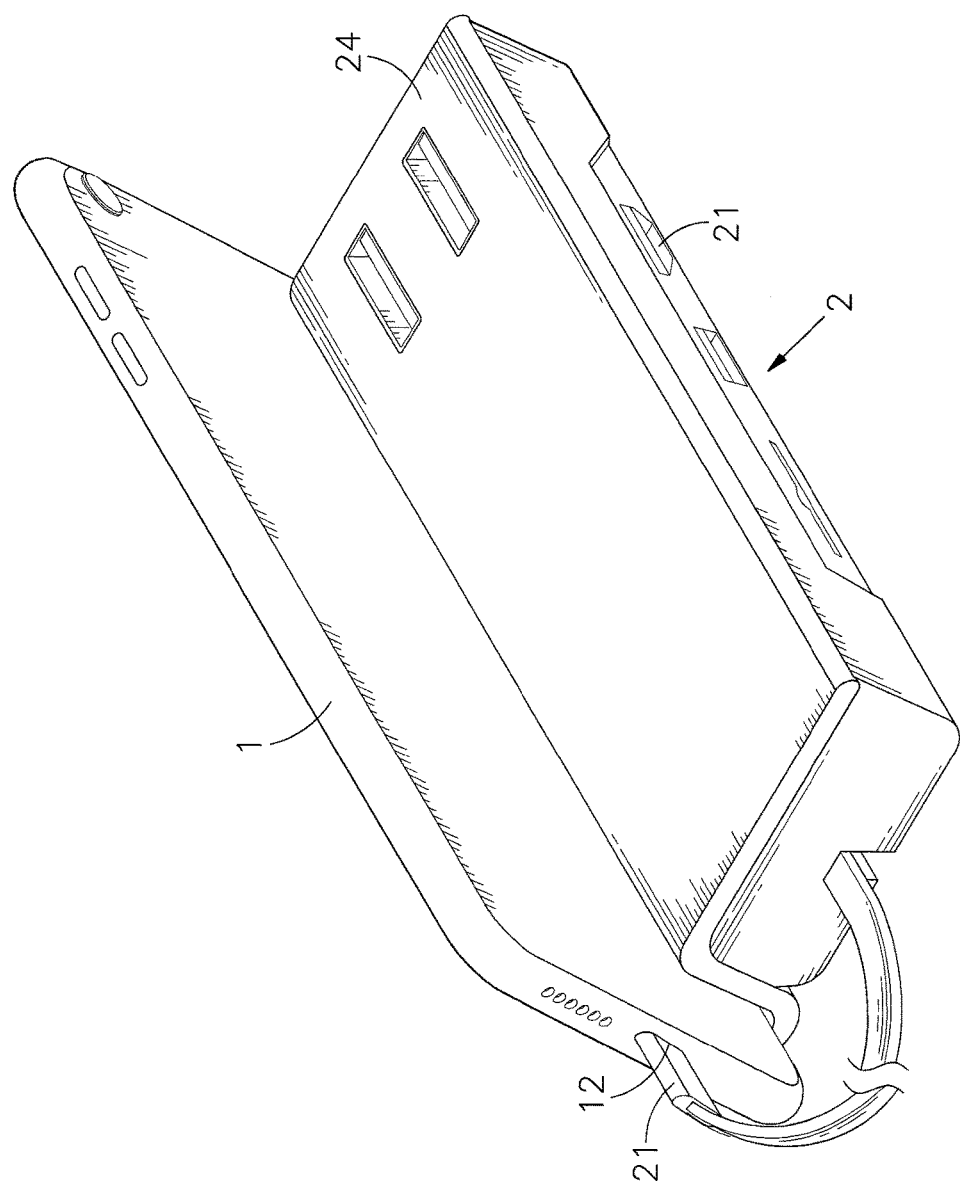
FIG. 6 is an applied view of the present invention, illustrating a smart phone connected to the intelligent storage module.

Referring to FIGS. 1-3, the invention provides an intelligent storage device signal transmission method for use in a combination mobile electronic device and storage module for signal transmission. The combination mobile electronic device and storage module comprises an electronic device 1 and an intelligent storage module 2. The intelligent storage device signal transmission method comprises the steps of:

(A1) Electrically connect the intelligent storage module 2 and the electronic device 1 together.

(A2) Enable the built-in identification system of the microprocessor unit 22 of the intelligent storage module 2 to identify whether or not the electronic device 1 is an iOS device (such as iPhone or iPAD) by means of a numeric identification code (USB VID/PID), and then proceed to step (A3) if yes, or step (A4) if not.

(A3) The electronic device 1 is an iOS device (such as iPhone or iPAD). Thus, enable the USBMUX communication protocol channel for signaling between the intelligent storage module 2 and the iOS electronic device 1, and then proceed to step (A5).

(A4) The electronic device 1 is an Android smart phone or tablet computer. Thus, enable the Android USBAOA communication protocol channel for signaling between the intelligent storage module 2 and the Android electronic device 1, and then proceed to step (A5).

(A5) Enable the file system of the downloaded application software (APP) of the electronic device 1 to identify the file format of the intelligent storage module 2.

(A6) Enable the microprocessor unit 22 of the intelligent storage module 2 to define the data packet format of the DATA block through the USBMUX or USBAOA communication protocol channel.

(A7) Enable the intelligent storage module 2 to transmit data packets to the application software (APP) of the electronic device 1 for data packet resolution.

(A8) Use the built-in file system of the application software (App) of the electronic device 1 to identify and solve the received data packets.

(A9) Provide the file data of the resolved data file to the data storage software of the electronic device 1 for application.

(A10) Enable the intelligent storage module 2 and the electronic device 1 to transmit signal therebetween for saving the backup, or enable the intelligent storage module 2 to charge the electronic device 1, and then release the electronic connection between the intelligent storage module 2 and the electronic device 1 after the signal transmission is completed.

In the aforesaid step (A6), the procedure of defining the data packet format of the DATA block is to divide the data packet into six defined blocks, including: start flag, packet sequence number coding, opcode, data length, block number, and data. Please refer also to the following request packet format:

| Start | ID | Operation Code | Data Length | Block No. | Data |
| --- | --- | --- | --- | --- | --- |

In the aforesaid request packet format:

I. Start flag: it contains 4 bytes and is the packet identification flag, using 0xFF555FF5.

II. Packet sequence number coding: It contains 4 bytes, and is generated by the intelligent storage module 2 for use as the unique identifier for the packet; when the mobile electronic device 1 of the receiver side is going to make a response after received the signal, it gives a response by inputting the same packet sequence number, allowing two-way communication between the intelligent storage module 2 and the mobile electronic device 1.

III. Opcode: It contains four bytes, and is defined as bellows:

| OP Code 3 | OP Code 2 | OP Code 1 | OP Code 0 |
| --- | --- | --- | --- | in which:

OP code1/OP code0:

0x0000: Read operation. 0x0001: Write operation. 0x0002: Hardware upgrade operation startup. 0x0003: Hardware upgrade data transmission. 0x0004: Disk storage size query. 0x0005: Number of disks query. 0x0006: Hardware version query.

OP code3/OP code2: Receiving or sending operation of flag data.

0x0001: Sending data; send data from the storage block.

0x0002: Receiving data; store data in the data block.

IV. Data length: The number of data bytes in the data block (DATA).

V. Block number: It contains four bytes, and is the corresponding block number when the disk is being operated.

VI. Data Block: Maximum 4 G Bytes.

The reply packet format of the receiver side:

| START | ID | Data Length | Block NO. | DATA |
| --- | --- | --- | --- | --- |

The definition of the content of the replay packet format is same as the aforesaid request packet format.

Further, in step (A8), the file system of the APP of the electronic device 1 can be FAT32 file system (the size of each individual file may not exceed 4 GB), or exFAT file system (that allows individual files larger than 4 GB). Further, according to file management requirements, the storage space of the intelligent storage device 2 is divided into a plurality of spaces having different functions to facilitate managing the storage, reading, or querying of files so as to obtain the root of the file according to the file name or attribute and to further obtain the file data of the information of the relevant properties of files through the analysis of the root directory of the directory entry for storage.

The file system structure, in fact, is the storage device space that is divided into specific spaces of different functions according to file management needs in order to facilitate management of file storage and query. Here FAT32 (File Allocation Table, FAT) file system is used as an example, which consists of DBR and its reserved sectors (magnetic sector), FAT1, FAT2, and DATA.

These structures are created when the partition is formatted, wherein:

① DBR and its reserved sectors (DOS BOOT Record) is the system operation boot record, containing some reserved sectors for storing system device information.

② FAT1 is a file allocation table; FAT32 has two file allocation tables (i.e., FAT1, FAT2); FAT1 is the first file allocation table for file management.

③ FAT2 is the second file allocation table of FAT32; it is mainly used to back up FAT1 files, also known as backup FAT ④ DATA is the main data saving area of FAT32 file system, which contains file or directory information and file data; the data area includes the directory entries of file name and file attributes and file content.

The process of reading the file includes the step of accessing to the file name and file attributes [the most important is the file starting cluster], and the step of using the FAT table to calculate the actual allocation of the file in the storage space (i.e., sector) via the beginning of the file cluster (starting cluster), and the step of going to the sector where the file content is allocated and then fetching the file content.

The step of access to the file name and file attributes includes (A) access root directory file and (B) access to subdirectory file:

(A) Access to root directory file, that is, the file you want to query is in the root directory; the access to root directory file is the process of resolving the directory items of the root directory to obtain the information of the relevant file attributes, which includes the sub steps of:

{first} Locate DBR by analyzing MBR information to obtain the start position of DBR.

{second} Locate first cluster of root directory by analyzing the data in BPB (BIOS Parameter) of MBR to obtain the value of the parameters of "DBR reserved sectors" and "each individual FAT32 sector", and read every cluster sector (magnetic sector) of this partition [a cluster consists of several sectors; when reading and writing file contents, cluster is used as a unit], and its calculation: root directory start sector (magnetic sector)=DBR start sector+DBR reserved sectors+number of sectors of FAT32×2:

{third} Locate root entry, where the file directory entry is located in the start sector (magnetic sector) of the directory by the file name; if there are many files in the directory and the file directory occupies multiple clusters, and if the directory entry of the file to be queried is not found in the first cluster of the file directory, use the active cluster of the directory to find the next directory cluster in the FAT32 table, and then use the cluster number of the cluster thus found to calculate the start sector of this cluster, and then continue from this sector to find the directory entry, and so on, until you find the file directory entry to be queried.

The above method for calculating the start sector of the cluster:

Cluster start sector=(cluster number-2)×the number of sectors per magnetic sector+the magnetic sector of the root directory.

Through the analysis of the directory entry can obtain the start cluster, file size and file creation date of the file required, and the information that the directory entry is a file or a directory.

(B) Access to subdirectory file; in the directory file management, if the directory entry is a directory entry of a subdirectory, extract the file start cluster in the directory entry, and then calculate the start sector number of the cluster, and the directory entry of the file in this subdirectory is in the sector starting with the sector number.

Reading the content of the file is to obtain the file start cluster through the analysis of directory entry, and then to calculate the start sector of this cluster. The method for calculating the start sector of the cluster:

Cluster start sector=(cluster number-2)×the number of sectors per cluster+the start sector of the root directory.

(cluster number-2) is just because [0 and 1] is a system reserved cluster; the second cluster is usually the start cluster of the root directory.

Read the data of [1]×the number of sectors per cluster or [n]×× data of the number of sectors per cluster of the sector (magnetic sector) that starts with this cluster; this [n] means this file not only occupies one cluster, and is found through the FAT32 table, which [N] clusters are continuous [the ending sector of the previous cluster plus is the starting cluster of the next cluster]; if the file is not continuous, read the contents of one cluster and check the FAT32 table to find a next cluster, and then read the contents of the cluster duly found, and then repeat this operation until a next cluster of [0x0FFFFFFF] is found through the FAT32 table; that is, repeating the operation till the end of the file where this file has been read completely and all the contents of the file has been shown on the electronic device 1; unlike the method of the existing FAT system that must first search FAT indexing to find the next successive cluster, the file content reading (or storing) operation method of the present invention enables the data file to be directly retrieved by access to the absolute location, thereby speeding up the file data access speed; further, the file content reading (or storing) operation method of the present invention also eliminates the drawbacks of the existing FAT system that can only open a read or write permission for the same file at a time, and does not need to constantly open or close the file, saving much access time.

Further, the aforesaid electronic device 1 can be a smart phone, tablet computer, PDA or notebook computer; the processor 11 of the electronic device 1 can be a CPU (central processing unit), microprocessor or processor IC; the transmission interface 12 that is electrically connected to the processor 11 can be an electric connection interface of USB2.0, USB3.0, USB Type-C, USB3.1, Micro USB, Mini USB or Apple Lightning; the storage software 13 that is built in the processor 11 of the electronic device 1 can be a data storage system application software (APP) of iOS/Android system for providing functions such as transmission, storage, and reading of electronic data signal between the electronic device 1 and the intelligent storage module 2 in a rapid manner.

Further, the aforesaid intelligent storage module 2 can be a hard disk drive (HDD), solid state drive (SSD), secure digital (SD) card, trans flash (TF) card, USB Flash, embedded MultiMediaCard (eMMC) or Nand Flash for storing electronic signals and data; the docking interface 21 of the intelligent storage module 2 can be an electric connection interface of USB2.0, USB3.0, USB Type-C, USB3.1, Micro USB, Mini USB or Apple Lightning; the microprocessor unit 22 of the intelligent storage module 2 can be a central processing unit (CPU), microprocessor or processor IC, having built therein a detection software that can detect, recognize, and record the date, backup time, tag name, update date, and size of the data or electronic signals transmitted by the electronic device 1, and compare the detected data with the backed up data content in the storage unit 221 for matching and analysis, so as to exclude the same data content that has already been backed up and to back up the un-backed up data or electronic signals on the storage unit 221, thereby saving much data backup time and labor. Further, when the intelligent storage module 2 backs up data after connection to the electronic device 1, the intelligent storage module 2 can simultaneously charge the electronic device 1.

Further, the transmission interface 12 of the electronic device 1 and the docking interface 21 of the intelligent storage module 2 can be of the same type or different types of signal transmission interfaces; by means of respectively connecting two opposing mating connectors of a transmission cable to the transmission interface 12 of the electronic device 1 and the docking interface 21 of the intelligent storage module 2, the electronic device 1 and the intelligent storage module 2 are electrically connected for signal transmission.

Referring to FIGS. 4-6 and FIG. 3, the electronic device 1 can be a mobile electronic device such as smart phone, tablet computer, notebook computer, or global positioning system; the electronic device 1 comprises a processor 11 and at least one transmission interface 12, wherein the processor 11 has built therein a data storage software, which comprises a data browser operation interface, an application layer for the implementation of the operation interface, a data system layer that supports the data system related storage protocols (iOS or Android) of FAT32/NTFS/exFAT/Ext, a disk block operation protocol layer, a data transport protocol layer and a data storage layer. The at least one transmission interface 12 is electrically connected to the processor 11.

The intelligent storage module 2 comprises at least one docking interface 21, a microprocessor unit 22, a storage unit 221, a power supply unit 23, and a housing 24 that houses the docking interface 21, the microprocessor unit 22, the storage unit 221 and the power supply unit 23. The at least one docking interface 21 extends out of at least one side of the housing 24. The housing 24 comprises a mobile device holder 241 extended from an outer wall thereof for holding the electronic device 1. The docking interface 21 can be USB2.0, USB3.0, USB Type-C, USB3.1, Micro USB, Mini USB or Apple Lightning. The microprocessor unit 21 can be a central processing unit (CPU), microprocessor or processor IC, having built therein a detection software for detecting and identifying the backup date, backup time, update date, tag name, and capacity size of the data or electronic signal received from the mobile electronic device 1.

Further, the intelligent storage module 2 has an identification system built in the microprocessor unit 21 that is capable of using a numeric identification code such as USB VID or PID to identify whether the electronic device is an iOS device (iPhone or iPAD) or Android smart phone, tablet computer or notebook computer.

The microprocessor unit 21 has a file system built therein. This built-in file system enables the USB MUX or AOA communication protocol channel to define the packet format for the iOS device or the Android device respectively, and then to transmit the data packet to the application software (APP) of the electronic device 1 for analyzing the data packet. Thereafter, the electronic device 1 enables a built-in file system of the application software (App) to identify and solve received data packet. At this time, the electronic device 1 can transmit data signal to the intelligent storage module 2 for data backup. Further, through the docking interface 21 and the transmission interface 12, the power supply unit 23 of the intelligent storage module 2 can charge the electronic device 1. Further, the electronic device 1 can be placed in the mobile device holder 241 of the housing 24, so that the electronic device 1 can sufficient electric energy from the intelligent storage module 2. Thus, the intelligent storage module 2 can run data backup when charging the electronic device 1. Further, the power supply unit 23 can be a DC or AC type power source such as a lithium battery, a dry cell, or a rechargeable battery that is capable of charging the electronic device 1.

In conclusion, the invention provides an intelligent storage device signal transmission method for use in a combination of mobile electronic device and storage module consisting of a mobile electronic device and storage module. Through the transmission interface, the electronic device is electrically connected to the docking interface of the intelligent storage module so that the built-in identification system of the microprocessor unit of the intelligent storage module can use a numeric identification code to identify the system type of the electronic device, and then enable the mating communication protocol channel for signal transmission between the intelligent storage module and the electronic device. Further, the microprocessor unit of the intelligent storage module defines the data packet format of the DATA block prior to transmission of data packets to the electronic device for data packet resolution. The microprocessor unit of the intelligent storage module has a file system built therein. This built-in file system enables the USB MUX or AOA communication protocol channel to define the packet format for the iOS device or the Android device respectively, and then to transmit the data packet to the application software (APP) of the electronic device for analyzing the data packet. Thereafter, the electronic device identifies and solves received data packet. At this time, the electronic device can transmit data signal to the intelligent storage module for data backup. Through the built-in detection software, the intelligent storage module can detect, recognize, and record the date, backup time, tag name, update date, and size of the data or electronic signals being transmitted by the electronic device, so as to exclude the same data content that has already been backed up and to back up the un-backed up data or electronic signals on the storage unit, thereby saving much data backup time and labor. Further, when the intelligent storage module backs up data after connection to the electronic device, the intelligent storage module can simultaneously charge the electronic device Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An intelligent storage device signal transmission method, comprising the steps of:
   (A1) electrically connecting an intelligent storage module and an electronic device;
   (A2) enabling a built-in identification system of a microprocessor unit of said intelligent storage module to identify whether or not said electronic device is an iOS device by means of a numeric identification code, and then proceeding to step (A3) if yes, or step (A4) if not;
   (A3) said electronic device being an iOS electronic device, enabling a USBMUX communication protocol channel for signaling between said intelligent storage module and the said iOS electronic device, and then proceeding to step (A5);
   (A4) said electronic device being an Android smart phone or tablet computer, and thus, enabling an Android USBAOA communication protocol channel for signaling between said intelligent storage module and said Android electronic device, and then proceeding to step (A5);
   (A5) enabling a file system of a downloaded application software (APP) of said electronic device to identify the file format of said intelligent storage module;
   (A6) enabling said microprocessor unit of said intelligent storage module to define a data packet format of a DATA block through a USBMUX or USBAOA communication protocol channel;
   (A7) enabling said intelligent storage module to transmit data packets to the said application software (APP) of said electronic device for data packet resolution;
   (A8) using a built-in file system of the said application software (App) of said electronic device to identify and solve received data packets;
   (A9) providing the file data of the resolved data file to a data storage software of said electronic device for application; and
   (A10) enabling said intelligent storage module and said electronic device to transmit signal therebetween, and then releasing the electronic connection between said intelligent storage module and said electronic device after the signal transmission is completed,
   wherein in step (A2), the said identification system that is built in said microprocessor unit of said intelligent storage module is capable of using a numeric identification code of USB VID or PID to identify whether said electronic device is an iOS device or Android device; the said file system that is built in said microprocessor unit said intelligent storage module is capable of enabling a USB MUX or AOA communication protocol channel to define the packet format for the iOS device or the Android device; said intelligent storage module comprises a storage unit a docking interface and a power supply unit electrically connected to said microprocessor unit; in step (A10), during data signal transmission between said intelligent storage module and said electronic device through one said docking interface of said intelligent storage module and one said transmission interface of said electronic device for backup, said power supply unit of said intelligent storage module charges said electronic device via one said docking interface and the said transmission interface.

2. The intelligent storage device signal transmission method as claimed in claim 1, wherein in step (A1), said electronic device is a mobile electronic device selected from the group of smart phones, tablet computers, notebook computers and global positioning systems; said electronic device comprises a processor and at least one transmission interface electrically connected to said processor, said processor having the said data storage software built therein, said data storage software comprising a data browser operation interface, an application layer for the implementation of the operation interface, a data system layer that supports the data system related storage protocols (iOS or Android) of FAT32/NTFS/exFAT/Ext, a disk block operation protocol layer, a data transport protocol layer and a data storage layer, each said transmission interface being an electric connection interface selected from the group of USB2.0, USB3.0, USB Type-C, USB3.1, Micro USB, Mini USB and Apple Lightning; said intelligent storage module comprises at least one docking interface, the said microprocessor unit, a power supply unit and a housing that houses said at least one docking interface, the said microprocessor unit and said power supply unit, said at least one docking interface being extended out of at least one side of said housing, said housing comprising a mobile device holder extended from an outer wall thereof for holding said electronic device, said at least one docking interface being respectively selected from the group of USB2.0, USB3.0, USB Type-C, USB3.1, Micro USB, Mini USB and Apple Lightning, said microprocessor unit being selectively a central processing unit (CPU), a microprocessor or a processor IC that has built therein a detection software for detecting and identifying the backup date, backup time, update date, tag name, and capacity size of a data or electronic signal being received from said electronic device.

3. The intelligent storage device signal transmission method as claimed in claim 1, wherein in step (A6) the procedure of defining the data packet format of the DATA block is to divide the data packet into six defined blocks, including: start flag, packet sequence number coding, opcode, data length, block number, and data.

4. The intelligent storage device signal transmission method as claimed in claim 1, wherein in step (A8), said file system of said application software (APP) of said electronic device is selectively FAT32 file system (the size of each individual file does not exceed 4 GB), or exFAT file system (that allows individual files larger than 4 GB); according to file management requirements, the storage space of said intelligent storage device is divided into a plurality of spaces having different functions to facilitate managing the storage, reading, or querying of files so as to obtain the root of the file according to the file name or attribute and to further obtain the file data of the information of the relevant properties of files through the analysis of the root directory of the directory entry for storage.

5. The intelligent storage device signal transmission method as claimed in claim 4, wherein said FAT32 file system consists of DBR and the preserved magnetic sectors, FAT1, FAT2, and DATA.

6. The intelligent storage device signal transmission method as claimed in claim 4, wherein the process of reading the file includes the step of accessing to the file name and file attributes [the most important is the file starting cluster], and the step of using the FAT table to calculate the actual allocation of the file in the storage space [i.e., sector (magnetic sector)] via the beginning of the file cluster (starting cluster), and the step of going to the sector where the file content is allocated and then fetching the file content; the step of access to the file name and file attributes includes (A) access root directory file and (B) access to subdirectory file: reading the content of the file is to obtain the file start cluster through the analysis of directory entry, and then to calculate the start sector of this cluster, the method for calculating the start sector of the cluster: cluster start sector=(cluster number-2)×the number of sectors per cluster+the start sector of the root directory.

* * * * *